Sept. 30, 1958     F. W. GRUNEL     2,854,137
MAGNETIC FILTER

Filed March 18, 1953     3 Sheets-Sheet 1

INVENTOR
FRIEDRICH WILHELM GRUNEL
BY
AGENT

Sept. 30, 1958     F. W. GRUNEL     2,854,137
MAGNETIC FILTER

Filed March 18, 1953                                3 Sheets-Sheet 2

INVENTOR
FRIEDRICH WILHELM GRUNEL
BY
AGENT

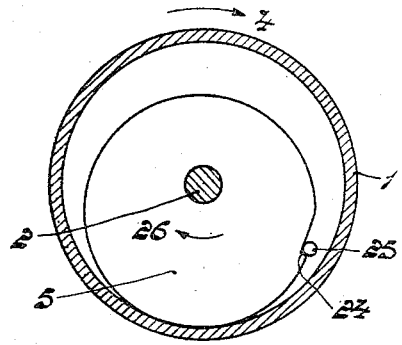
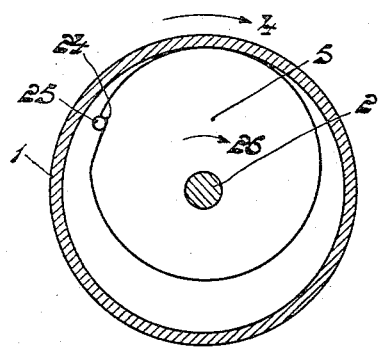
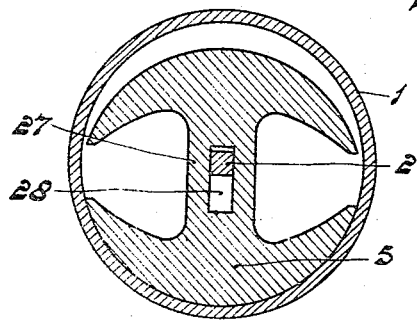
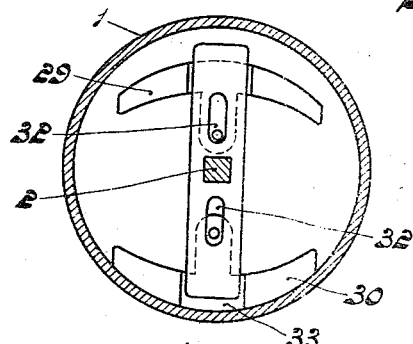
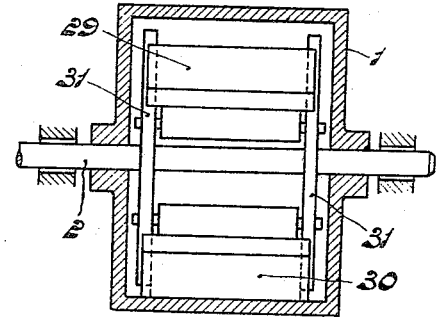

United States Patent Office 2,854,137
Patented Sept. 30, 1958

2,854,137

MAGNETIC FILTER

Friedrich Wilhelm Grunel, Hamburg-Wellingsbuttel, Germany, assignor, by mesne assignments, to North American Philips Company, Inc., New York, N. Y., a corporation of Delaware Application March 18, 1953, Serial No. 343,189

Claims priority, application Germany June 28, 1952

6 Claims. (Cl. 209—215)

The invention relates to a magnetic filter for removing ferro-magnetic particles from suspensions or dry mixtures by means of one or more magnets withdrawing the particles from the substance to be filtered. Such filters are particularly suitable for removing iron particles, which may be very harmful, from liquids used in cutting apparatus, for lubrication and for cooling, from ceramic slime or dry ceramic mixtures, from enamel, soap lye and so on.

It is known to use for this purpose magnetic filters, in which the substance to be filtered passes through a plurality of strong magnetic fields and the iron particles are withheld in air gaps. From time to time these magnetic filters must be freed from the precipitated iron particles.

In order to ensure an uninterrupted operation it has been suggested to use strong permanent magnets arranged in a rotating aluminium disc, which is immersed into the substance to be filtered and withholds the iron particles, withdrawing them from the substance, after which the particles are removed by means of a scraper.

It has, however, been found that in such uninterruptedly operating filters scraping off the iron particles from the rotating disc gives rise to difficulties. Owing to the required high fieldstrength of the permanent magnets greater or smaller quantities of iron particles frequently continue to adhere to the disc and are thus re-introduced into the purified substance.

According to the invention this disadvantage is obviated in that one or more magnets are arranged inside a partially immersed, rotating drum of non-magnetic material in a manner such that the ferro magnetic particles are held on the surface of the drum during its rotation only until they reach the area of a scraping-off device, in the range of which the particles are withheld on the drum substantially only by friction and the force of gravity and can be readily removed by the scraping-off device. Therefore the magnets exert their force on the ferromagnetic particles until the particles urged against the drum surface and carried along by the rotation of the drum have reached the area over the horizontal surface of symmetry of the drum in the proximity of the scraping-off device. At this area the magnetic force may be suppressed more or less abruptly, so that the scraping-off operation may be effected without difficulty.

In order that the invention may be readily carried into effect, it will now be described with reference to the accompanying drawing, in which Fig. 1 shows a magnetic filter according to the invention, comprising a stationary magnet system in a sectional view.

Fig. 9 shows a filter comprising a magnet system performing an irregular rotation.

Fig. 10 shows the same in a different position of the magnet system.

Fig. 11 shows a filter comprising a unitary magnet system, which is displaceable transversely on the drum shaft.

Fig. 12 shows a filter comprising two magnet systems, movable transversely to the drum shaft in a slide guide.

Fig. 13 shows the same filter in a lateral view.

Figure 1:
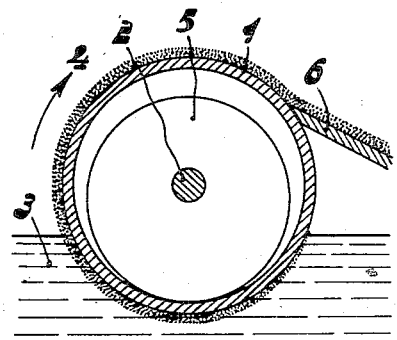
Figure 2:
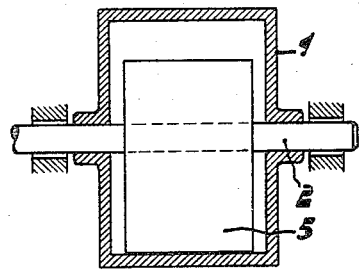
Fig. 2 shows the same filter in a lateral view.

Figs. 1 and 2 show a magnetic filter according to the invention, comprising a drum 1 of non-magnetic material, rotatable on a shaft 2. The drum is immersed in part in the substance 3 to be filtered out, which may be constituted by a liquid, ceramic slime or a dry ceramic mixture containing ferro-magnetic particles. The direction of rotation of the drum 1 is indicated by the arrow 4.

Inside the drum provision is made for an eccentric magnet body 5, which does not rotate with the drum, since it is supported by the shaft 2, for example, with negligible friction. The arrangement is such that the eccentric body, which may be magnetized in a vertical direction, almost touches the inner wall of the drum 1 at the lower end. This position is maintained owing to the loose journalling and the weight even during the rotation of the drum.

Consequently, the magnetic field strength is high in that part of the drum which is surrounded by the substance to be filtered, so that the ferro-magnetic particles are withdrawn from the slowly moving substance to be filtered and find their way to the drum surface, as is shown in Fig. 1. Upon rotation of the drum 1 in the direction of the arrow the attracted particles are removed out of the suspension 3 and arrive at the upper half of the drum, where the distance between the magnet body 5 and the drum wall is no longer negligibly small. Thus at this area the magnetic field strength is materially lower, so that the particles are hardly held on the drum surface by the magnetic force; they adhere only by friction and gravitation. Then they move further to the right and arrive at a scraping-off device 6, which removes the particles from the drum surface and conducts them away. The scraping-off device may, for example, be constituted by a simple piece of iron substantially tangential to the drum surface. In such a magnetic filter the operation is ensured, since within the range of the scraping-off device substantially no magnetic field strength prevails.

Figure 3:
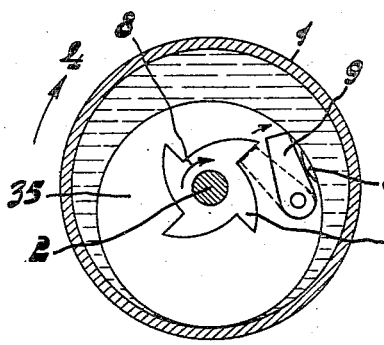
Fig. 3 shows a magnetic filter comprising a swinging magnet system provided with a pawl device.
Figure 4:
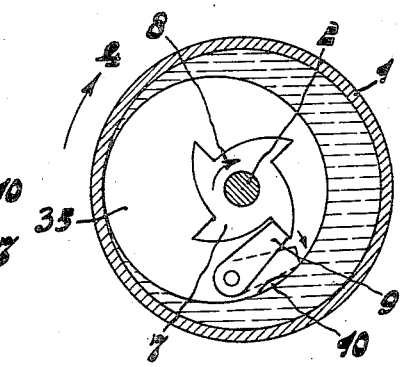
Fig. 4 shows the same filter in a different position of the magnet system.

An improved embodiment of such a magnetic filter is shown in Figs. 3 and 4. Also in this case the eccentric magnet system 35 is freely rotatable on the shaft 2 rotating with the drum. Moreover, the shaft 2 supports a ratchet wheel 7, rotating with the shaft, as is indicated by the arrow 8. A suitable pawl 9 is secured to the magnet body 35 so as to be readily movable and may occupy either the position indicated by broken lines, in which the magnet body 6 is coupled with the shaft 2, under the action of the gravitation, or the drawn-out free position, in which the shaft and the magnet body are disengaged and the pawl engages a stop 10 of the magnet body 35.

If the magnet body takes up the position shown in Fig. 3, the pawl 9 falls, as is shown, into the next following tooth of the ratchet wheel under the action of the gravitation, so that the magnet body 35 is caught by the shaft 2. Thus the body gradually takes up the position shown in Fig. 4, in which the pawl 9 tends to take up the position indicated in broken lines in this figure under the action of the gravitation. This movement of the pawl will take place, if the device is suitably arranged, more particularly, if the pawl angle and the weight of the pawl are suitably chosen. Thus the coupling between the shaft 2 and the magnet body 35 is released; under the action of its own weight the body swings into the initial position shown in Fig. 3, whereupon the operation is repeated. In order to damp the movements it is efficient, as is shown, to fill the drum space with oil.

Such a swinging movement of the magnet body has the advantage that the iron particles attracted to the drum surface are held more tightly on their way upwards and that the area of the scraping-off device arranged as is shown in Fig. 1 is further withdrawn from the range of action of the body 35.

Figure 5:
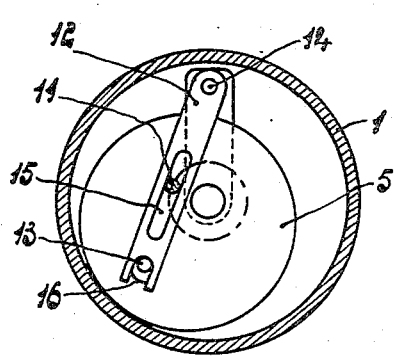
Fig. 5 shows the same filter, in which the magnet system is controlled by means of groove guides.
Figure 6:
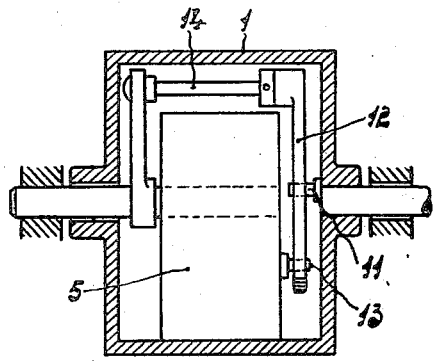
Fig. 6 shows the same filter in a lateral view.

A further embodiment of such a magnetic filter is shown in Figs. 5 and 6; this filter does not comprise, however, a pawl system, but a slide guide which mainly comprises a catch 11, secured to the drum 1, a lever 12 and an extension 13, secured to the magnet body 45. The lever 12 is supported by a shaft 14, secured in the drum 1 and is rotated by means of the extension 11 through an angle determined by the angle of rotation of this extension. The extension 11 slides into a fitting groove 15 of the lever 12 and its rotation is transferred by means of a second groove 16 to the extension 13 and hence to the magnet body 45.

Figure 7:
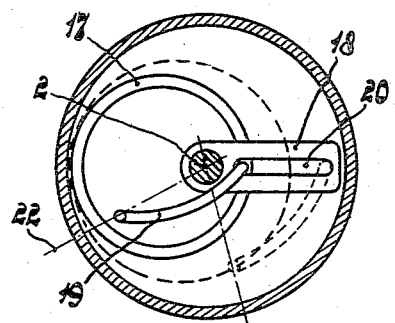
Fig. 7 shows such a filter in which the magnet system is guided by an arc.
Figure 8:
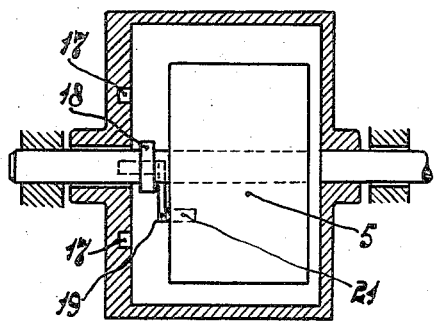
Fig. 8 shows the same in a lateral view.

In the case of an arc guide the swinging movements of the magnet body 55 may also be controlled; Figs. 7 and 8 show diagrammatically such an arrangement. In this case the arc guide comprises an eccentric groove 17 provided in one sidewall of the drum. A slide guide 18 is stationary inside the drum and a lever 19, bent over at right angles at both ends, engages the groove 17 with its bent end, across a longitudinal hole 20 of the slide guide. The other bent end of the lever 19 engages a fitting bore 21 of the magnet body 55.

Upon rotation of the drum the eccentrically swinging groove 17 causes the lever 19 to rock horizontally in the longitudinal hole 20 and this movement is at the same time transferred to the magnet body 55, which thus performs swinging movements about the shaft 2. The end positions of this swinging movement in the device shown are indicated by the dot-and-dash centre lines 22 and 23.

A structurally very simple embodiment of a filter according to the invention is shown in Figs. 9 and 10. The magnet body 65 is supported inside the drum so as to be readily rotatable on the shaft 2 and is provided at the right-hand outer edge with a recess 24, in which fits a stop stud 25, which is directly connected with the drum 1. Upon rotation of the drum 1 in the direction of the arrow 4, the magnet body 65 is carried along and moves with the same rotary speed in the direction of the arrow 26. This movement continues until the magnet body 65 reaches the position shown in Fig. 10. From this instant the speed of the body 65 will rapidly increase considerably under the action of its own weight; the body leads the rotation of the drum 1 and falls into the position shown in Fig. 9. There it stays until it is overtaken by the stop stud 25, whereupon the operation is repeated.

This arrangement has the advantage that the ferromagnetic particles attracted by the magnet body 65 are constantly held on the drum surface on their way upwards until they have reached approximately the highest point. Then they arrive in the proximity of the scraping-off device, which is arranged as is shown in Fig. 1. When subsequently the magnet body 65 falls downwards in its right-hand rotation in the manner described above, the magnetic attraction for the ferro-magnetic particles disappears, so that the particles may be readily scraped off.

In the embodiment of the magnetic filter shown in Fig. 11 the magnet body 75 is shaped substantially in the form of a double T; in the centre of the intermediate piece 27 is provided a slot 28. By means of this slot the body is displaceable along the shaft 2' of the drum 1, the shaft being square in this case. Under the action of the gravity the body takes up the position shown inside the drum 1.

The particles attracted by the lower part of the magnet body are, consequently, held when the magnet rotates and transported upwards until the magnet body, just before the end of half a revolution, slides down owing to the slot 28, along the square shaft 2' and re-occupies approximately the position shown. Thus the particles transported upwards are hardly any longer subjected to the magnetic field, so that they may be readily removed. In this case also it is advisable to fill the drum 1 with oil to avoid hard shocks and in order to damp the movements.

Such a device is shown in Figs. 12 and 13. However, in this case, the magnet body comprises two separate parts 29 and 30, rotatably arranged in holders 31 so as to be displaceable transversely to the axial direction of the drum 1. They are provided with studs sliding in corresponding slots 32 of the holders and, moreover, with groove-shaped recesses 33 for their guidance. The holders are seated on the shaft 2', rotating with the drum 1.

Since the two separate magnets 29 and 30 are adapted to move freely in a radial direction, the lower magnet 30 touches the drum during the rotation, so that the magnetic attraction for the ferro-magnetic particles is strong at this area. The magnet taking up the top position is located at a great distance from the drum surface, so that the particles are hardly attracted. During the rotation the magnet 30 holds the attracted particles until they arrive in the proximity of the highest point of the drum. There the magnet slides down under the action of the gravitation, whilst at the same time the other magnet performs the same movement, touching the inner wall of the drum. This operation is alternately repeated during the rotation of the drum. The particles on the upper part of the drum circumference are held substantially only by friction and gravitation, so that they can be readily scraped off.

A possible embodiment of the magnetic filter according to the invention consists in that the magnets are arranged inside the rotating drum in such a way, that in the upper portion of the drum, preferably in the proximity of a scraper or discharge device, it is at a greater distance from the drum wall, an abrupt variation in distance along the circumference of the drum being, however, avoided, at least in the proximity of the scraper or discharge device and the drum. The reduction of the magnetic field strength is in this case of importance. If this reduction would take place comparatively abruptly, the particles would accumulate at the corresponding area on the drum and give rise to difficulties in the subsequent transport, so that a smooth operation could be obtained only with difficulty. The increase in magnetic field strength may, if desired, be abrupt, if this takes place sufficiently far behind the discharge area. The desired course of the magnetic field strength along the drum circumference may be obtained by means of suitable shape and dimensions of the magnets. When using multipolar magnets more areas of minimum field strength and hence more areas for scraping off may, if desired, be provided on the circumference of the drum. The arrangement may be such that the point of minimum field strength is not located in the center of the upper drum surface, but shifted considerably sideways in the direction of the rotation of the drum, so that the scraped off material may be readily conducted away.

A particularly simple embodiment of such a filter according to Fig. 1 of the invention is characterized in that the magnets are shaped approximately in the form of an eccentric disc and are supported by a shaft rotating with the drum, so that the magnets performed, for example, by friction, slow swinging movements about the shaft. Consequently, the eccentric disc is first moved by friction by the slowly rotating shaft supporting the disc until the moment produced by the rise of the center of gravity of the disc exceeds the frictional moment, after which the eccentric disc slides into its initial position or even, as the case may be, slightly further owing to inertia. This operation is constantly repeated. Such a movement of the magnets improve on the one hand the transport of the ferro-magnetic particles on the drum surface during the identical movement of the eccentric disc and on the other hand facilitates the scraping-off of the particles during the reverse movement of the accentric disc. In such a device and also in various other devices to be described hereinafter, it may be advantageous to fill the space inside the drum with oil of suitable viscosity, which serves not only for lubrication, but also for damping the movement of the eccentric disc.

In such a device the regular operation depends, as is described before, on two factors, i. e. on the frictional moment between the shaft and the eccentric disc and on the moment of the weight of the eccentric disc. The weight of the disc is constant, but the frictional moment is completely variable, since it varies with the surface position of the parts sliding over one another, with the lubricant, the temperature and similar factors. It may therefore be advantageous to control the swinging movements of the magnet system by mechanical means. For this purpose use may, for example, be made of a pawl device or a clamping device, in which a pawl or the like provides a fixed coupling between the shaft and the eccentric disc through a predetermined angle of rotation, while further, under the action of the gravitation, for example, the coupling is released by means of a lever connected with the eccentric disc or a rotating lever, charged by the weight, so that the eccentric disc can slide into its initial position and is re-coupled with the shaft by the pawl. It will be obvious that the safety in operation of the magnetic filter according to the invention is improved by such a device.

On the other hand, in many cases, the use of such a pawl device is not desirable, since in many forms of construction, it does not operate completely noiselessly and is, moveover, subjected to comparatively heavy wear. The invention relates therefore to an arrangement of the magnetic filter such that the means controlling the swinging movements are constituted by an arc, a sledge or similar guide means. In these guide means all hard shocks, strokes and the noise thus produced and wear are avoided.

A filter according to the present invention may, moreover, comprise such a drive of the magnet system that the latter rotates with the drum and performs, in addition, periodical movements reducing strongly the action on the ferro-magnetic particles, when the particles each time attracted by one pole approach the scraping-off area. Consequently, the spatial form of the magnetic field may be replaced by a temporary different field form.

For this purpose it is of advantage to construct a filter according to the invention in a manner such that the magnet system is provided on the shaft eccentrically so as to be freely rotatable and is provided with a stop for the system, rotating with the drum, this stop taking the system along for half a revolution, while the system performs the other half of the revolution at a leading rate under the action of the gravitation. Thus the magnet system moves successively at two different rates about the shaft, i. e. for half a revolution at the same speed as the drum and for the second half of the revolution at a considerably higher speed, after which the system remains stationary for some time. During its slow movement the magnet system acts upon the particles and carries them upwards on the drum surface; when the system reaches the scraping-off area, it rapidly leads in the rotation of the drum, so that the magnetic attraction disappears from below the particles, which are released and can thus be readily scraped off.

A further efficient embodiment of the invention consists in that the magnet system is displaceable transversely to the drum shaft, rotates inside the drum with the shaft and performs regular movements transversely to the shaft under the action of the gravitation. If, for example, a single magnet is provided inside the drum, it may bear by means of a groove in the direction of length on a square part of the shaft, having the width of the groove, so that upon rotation, the shaft takes along the magnet, which, after half a revolution slides down to the lower portion to the drum by its own gravitation. The upper magnet pole is kept at a suitable distance from the drum surface, so that substantially no attractive force is any longer exerted on the ferro-magnetic particles transported upwards, consequently, the particles may be readily scraped off. As an alternative, a plurality of such magnets may be arranged in groove guides in a manner such that they are carried along during the rotation and are removed at regular intervals by their weight from the upper drum surface and find their way to the bottom drum surface.

Such a magnetic filter is particularly suitable for uninterrupted operation and the substance to be filtered is supplied uninterruptedly and emerges purified from the filter.

What is claimed is:

1. A magnetic filter for removing ferro-magnetic particles from substances including suspensions or dry mixtures comprising a drum rotatable in one direction only composed of non-magnetic material, said drum being partly immersed in said substance, a magnetic member in said drum, a scraper engaging the outer circumference of said drum, means mounting said magnetic member for at least partial rotational movement in said drum during each rotation of said drum and for enabling said magnetic member to be moved periodically away from engagement with a portion of the inner circumference of said drum in the proximate region of said scraper whereby the action of the magnetic field on said particles is strongly reduced in said region.

2. A magnetic filter as set forth in claim 1 wherein said magnetic member is an eccentric disc, a shaft in said drum, and means mounting said eccentric disc on said shaft for slow, swinging movements about said shaft.

3. A magnetic filter as set forth in claim 1 wherein said magnetic member is an eccentric disc, a shaft in said drum, means mounting said eccentric disc on said shaft for slow, swinging movements about said shaft, and means including a pawl and ratchet device for controlling the swinging movements of said magnetic member and providing the disengagement of said member from said device after said drum rotates through a predetermined angle of rotation.

4. A magnetic filter as set forth in claim 1 wherein said magnetic member is an eccentric disc, a shaft in said drum, means mounting said eccentric disc on said shaft for slow, swinging movements about said shaft, and means including a guide for controlling the swinging movements of said magnetic member in said drum.

5. A magnetic filter as set forth in claim 1 wherein said magnetic member is an eccentric disc, a shaft in said drum, means mounting said eccentric disc for rotational movement on said shaft, a stop on said drum adapted to rotate said eccentric disc for approximately one-half of a revolution of said eccentric disc whereby said eccentric disc is rotated for the other one-half revolution by the action of gravity.

6. A magnetic filter as set forth in claim 1 further comprising means for displacing said magnetic member periodically in a direction substantially transverse to the axis of said drum to a position for further transverse displacement under the action of gravity.

References Cited in the file of this patent

UNITED STATES PATENTS

| 430,058 | Ball et al. | June 10, 1890 |
| 1,324,529 | Ullrich | Dec. 9, 1919 |
| 2,693,279 | Box | Nov. 2, 1954 |

FOREIGN PATENTS

| 191,492 | Germany | Nov. 9, 1907 |